(12) United States Patent
Finsterbusch et al.

(10) Patent No.: US 9,310,054 B2
(45) Date of Patent: Apr. 12, 2016

(54) INTERNALLY COOLED FLUORESCENT DEVICE AND REFLECTOR LAMP ARRANGEMENT INCLUDING SAID FLUORESCENT DEVICE

(75) Inventors: Klaus Finsterbusch, Berlin (DE); Ulrich Hartwig, Berlin (DE); Nico Morgenbrod, Berlin (DE)

(73) Assignee: OSRAM GMBH, Munich (DE)

( * ) Notice: Subject to any disclaimer, the term of this patent is extended or adjusted under 35 U.S.C. 154(b) by 27 days.

(21) Appl. No.: 13/980,590

(22) PCT Filed: Jan. 5, 2012

(86) PCT No.: PCT/EP2012/050129
§ 371 (c)(1),
(2), (4) Date: Jul. 19, 2013

(87) PCT Pub. No.: WO2012/098020
PCT Pub. Date: Jul. 26, 2012

(65) Prior Publication Data
US 2013/0301237 A1     Nov. 14, 2013

(30) Foreign Application Priority Data

Jan. 21, 2011 (DE) .................. 10 2011 002 961

(51) Int. Cl.
| | | |
|---|---|---|
| F21V 13/08 | (2006.01) | |
| F21V 29/00 | (2015.01) | |
| G03B 21/20 | (2006.01) | |
| F21V 9/16 | (2006.01) | |
| F21V 29/502 | (2015.01) | |
| F21S 10/00 | (2006.01) | |

(52) U.S. Cl.
CPC . *F21V 13/08* (2013.01); *F21V 9/16* (2013.01); *F21V 29/20* (2013.01); *F21V 29/502* (2015.01); *G03B 21/204* (2013.01); *F21S 10/007* (2013.01)

(58) Field of Classification Search
CPC .................................. F21V 13/08; F21V 29/20
See application file for complete search history.

(56) References Cited

U.S. PATENT DOCUMENTS

| | | |
|---|---|---|
| 5,386,250 A | 1/1995 | Guerinot |
| 6,147,720 A | 11/2000 | Guerinot et al. |

(Continued)

FOREIGN PATENT DOCUMENTS

| | | |
|---|---|---|
| CN | 1111359 A | 11/1995 |
| CN | 101929626 A | 12/2010 |

(Continued)

OTHER PUBLICATIONS

English abstract of JP 2007093690 A of Apr. 12, 2007.

(Continued)

*Primary Examiner* — Elmito Breval
(74) *Attorney, Agent, or Firm* — Viering, Jentschura & Partner mbB

(57) ABSTRACT

A dual fluorescent wheel with two disk-shaped carrier elements which are interconnected by wing-type cooling ribs is disclosed. When the dual fluorescent wheel rotates, air flows in through an axial opening in one of the carrier elements, the air flows radially through the interspace between the carrier elements or the wing-type cooling ribs and flows out at the edge. This airflow improves the dissipation of heat which is produced when an excitation laser irradiates the annular fluorescent strips located on the two exterior faces.

8 Claims, 3 Drawing Sheets

(56) References Cited

U.S. PATENT DOCUMENTS

| | | |
|---|---|---|
| 6,618,213 B2 | 9/2003 | Inamoto |
| 8,231,227 B2 | 7/2012 | Kurosaki |
| 2009/0284148 A1 | 11/2009 | Iwanaga |
| 2010/0208486 A1 | 8/2010 | Gladnick et al. |
| 2010/0328949 A1 | 12/2010 | Lai et al. |
| 2012/0320344 A1 | 12/2012 | Okumura |

FOREIGN PATENT DOCUMENTS

| | | |
|---|---|---|
| EP | 1605199 A2 | 12/2005 |
| JP | 2003156796 A | 5/2003 |
| JP | 2005294185 A | 10/2005 |
| JP | 2007093690 A | 4/2007 |
| JP | 2008052070 A | 3/2008 |
| JP | 2010197497 A | 9/2010 |
| JP | 2010217566 A | 9/2010 |
| JP | 2011075657 A | 4/2011 |
| WO | 2006133214 A2 | 12/2006 |
| WO | 2009017992 A1 | 2/2009 |
| WO | 2009069010 A1 | 6/2009 |
| WO | 2009112961 A1 | 9/2009 |
| WO | 2010116305 A1 | 10/2010 |
| WO | 2011118345 A1 | 9/2011 |

OTHER PUBLICATIONS

English abstract of JP 2005294185 A of Oct. 20, 2005.
English abstract of JP 2011075657 A of Apr. 14, 2011.
English abstract of JP 2010197497 A of Sep. 9, 2010.
Office Action issued in the corresponding Japanese application No. 2013-549765, dated Jun. 30, 2014.
First Office Action issued for CN 201280006007.3 on Feb. 7, 2014.
Office action dated Apr. 9, 2015 issued for the corresponding Chinese application 201280006007.3 and English translation thereof.

INTERNALLY COOLED FLUORESCENT DEVICE AND REFLECTOR LAMP ARRANGEMENT INCLUDING SAID FLUORESCENT DEVICE

RELATED APPLICATIONS

The present application is a national stage entry according to 35 U.S.C. §371 of PCT application No.: PCT/EP2012/050129 filed on Jan. 5, 2012, which claims priority from German application No.: 10 2011 002 961.3 filed on Jan. 21, 2011.

TECHNICAL FIELD

The disclosure relates to a fluorescent device for converting excitation-laser radiation into converted light. The disclosure also relates to a reflector lamp arrangement including this fluorescent device.

BACKGROUND

Due to the high surface power density of the excitation-laser beam spot on the luminous material provided for the conversion and the Stokes-shift effect occurring during the wavelength conversion, these fluorescent devices are usually constructed in the form of a freely rotating "fluorescent wheel". In this arrangement, the luminous material is applied to one side of a rotating disk. As a result, the momentarily irradiated fluorescent part area turns away under the excitation-laser beam spot before permanent local damage or even destruction of the luminous material occurs. Because of the rotation of the fluorescent wheel, the irradiated area describes an annular track after each complete rotation. The luminous material is therefore usually applied in the form of an annular track on one side of the fluorescent wheel. The heating of the luminous material caused by the excitation-laser radiation in the course of the operating time is transferred to the environment via the rear of the fluorescent wheel, among other things (radiation and convection cooling). Such fluorescent devices and reflector lamp arrangements equipped therewith are suitable for many applications which require light sources having a high intensity of illumination such as video projection, medical and industrial endoscopy by means of optical waveguides, effect lighting, car headlamps etc., and which have hitherto been the domain of reflector lamps based on halogen incandescent lamps or discharge lamps.

Document WO 2009/112961 A1 describes a laser light source which has at least one laser light emitting element, at least one light source output element (which is configured for directing the laser light onto a predetermined location), at least one conversion element and one reflector arrangement. The at least one conversion element includes a luminous material which converts the laser light at least partially into wavelength-converted or converted light. The reflector arrangement combines the converted light and the laser light to form a mixed output light.

Document US 2009284148 A1 discloses a light source device for a projector including an excitation-light source and a rotating fluorescent wheel. The fluorescent wheel has a transparent circular disk. On one side of the disk, a segmented annular track is arranged. The track is divided into three equally large segments, namely into one luminous material emitting in the red wavelength range (R), one luminous material emitting in the green wavelength range (G) and one diffusely transparent area (135). The excitation light impinges on the rear of the rotating fluorescent wheel, passes through the transparent disk and excites the luminous material of the annular track on the other side of this disk. The fluorescent wheel is thus used in the so-called transmissive mode. In the axis of the incident excitation light, an optical waveguide which forwards the converted light is arranged opposite the annular track.

In previous fluorescent wheels, inadequate cooling for preventing or at least delaying for a sufficiently long period a degradation of the luminous material excited by means of the excitation-laser radiation is disadvantageous, especially with increasing excitation-laser powers. This problem is intensified in the case of fluorescent wheels coated on both sides, not only because the heat dissipation via the rear of the fluorescent wheel is distinctly reduced but because, instead, excitation-laser radiation also impinges on the rear coated with luminous material, including the associated additional heating.

DESCRIPTION

Various embodiments of the disclosure specify an improved fluorescent device for excitation-laser radiation.

A further aspect of the disclosure consists in specifying an improved reflector lamp arrangement including this fluorescent device.

Various embodiments of the disclosure describe an internally cooled fluorescent device, including two disk-like carrier elements having two sides each which are arranged at a mutual distance in such a manner that one side of one carrier element faces one side of the other carrier element and as a result define two inside surfaces, facing one another, of the fluorescent device, the respective other two sides of the two carrier elements pointing toward the outside and thus defining two outside surfaces of the fluorescent device, at least one conversion area which contains luminous material and is arranged on at least one of the two outside surfaces, at least one opening which is arranged in at least one of the two carrier elements.

The aspects of the disclosure consist in specifying a fluorescent wheel including internal ventilation as forced cooling and achieving this by means of a fluorescent device in the form of a "dual fluorescent wheel". The fluorescent device according to the disclosure will, therefore, also be called "dual fluorescent wheel" in the text which follows. For this purpose, two disk-like carrier elements are provided which are arranged in parallel at a distance from one another and thus essentially form the basic structure of the dual fluorescent wheel. The luminous material is arranged in preferably annular conversion areas, i.e. circular fluorescent strips, on one of the two or both disk-shaped outside surfaces of the dual fluorescent wheel. In order to ensure an adequate cooling air flow during the rotation of the dual fluorescent wheel, at least one opening is arranged, preferably close to the axis or concentrically with the axis, in at least one of the two disk-like carrier elements. During the rotation of the dual fluorescent wheel, the ambient air or possibly another cooling medium flows in through the at least one opening into the interspace between the two disk-like carrier elements and essentially radially toward the outside, as a result of which the inside surfaces are cooled actively by the cooling air flowing past. For this forced flow, the suction effect in the opening is utilized which is produced due to the pressure difference because the air rotates more quickly in the edge area of the interspace than in its center. The disk-like carrier elements consist preferably of a material having good thermal conductivity, for example copper, so that by means of the "internal cooling" lastly a good dissipation of the heat introduced into the luminous material by the excitation-laser radiation is achieved.

In the interspace between the inside surfaces of the dual fluorescent wheel, cooling ribs can be provided in order to improve the heat dissipation. The cooling ribs are preferably wing-like and constructed to extend from inside surface to inside surface essentially radially in the direction toward the edge of the disk-like carrier elements in order to support the radial air flow from the opening to the edge of the interspace. In the case of a dual wheel in which the two disk-like carrier elements are rotatable separately from one another, each of the two carrier elements can have an associated set of cooling ribs. In addition, the cooling ribs are preferably bent aerodynamically in opposition to the direction of rotation in order to improve the radial air flow in the rotating interspace, and thus also the cooling effect, further. To this extent, the cooling ribs also have the function of wing-like flow elements.

As a cooling medium, other, preferably gaseous media are also considered, apart from the ambient air. For this purpose, it may be advantageous if the cooling circuit is closed, for example in that the entire fluorescent device is encapsulated in a suitable container. In addition, the cooling medium can also be precooled, for example via a heat exchanger.

For the rotation, the dual fluorescent wheel is provided with a suitable rotation means as is general practice in the case of fluorescent wheels, for example a suitable rotating bearing or a rotating shaft. The means for the rotation is connected to at least one of the two disk-like carrier elements, preferably axially with respect to the opening which is arranged in one of the two carrier elements. The two disk-like carrier elements can be solidly connected to one another or detached from one another and, as a result, be rotatable independently of one another. In the latter case, it may be provided that in operation, only one of the two disk-like carrier elements rotates or the two disk-like carrier elements rotate at different speeds (two drive shafts). As already mentioned, both carrier elements can also have in each case an associated set of cooling ribs in this context.

The luminous material located in the conversion areas of the disk-like carrier elements is used for wavelength conversion of the typically ultraviolet or blue excitation-laser radiation (e.g. 400-450 nm) into more wideband light having normally longer wavelengths (down conversion). Depending on requirement, different colors of light can be generated by this means, for example red (R), green (G) and blue (B), but also other colors of light such as, e.g., yellow. Suitable types of luminous material are, for example, cerium-doped YAG for green light (G) and europium-doped YAG for red light (R). The blue light component (B) normally used for white light in the case of additive color mixing can possibly be extracted from the blue excitation-laser radiation itself in that, apart from the at least one conversion area, at least one scattering area is also provided which is also arranged on at least one of the two outside surfaces of the dual fluorescent wheel. The scattering area does not have any luminous material but a reflectively scattering surface by means of which the blue excitation-laser radiation can be utilized directly, i.e. without conversion by a luminous material. Due to the reflectively scattering surface, the speckle effect, disturbing for direct use, especially for projection purposes (caused by the spatial coherence properties of the excitation-laser radiation) is advantageously destroyed or at least reduced.

The conversion and scattering areas and possibly the various types of luminous material can be arranged sequentially within a common annular area or also as a number of annular areas arranged concentrically. However, the various types of luminous material do not necessarily have to be arranged in segments but, instead, can also be present as mixture of luminous material within an annular conversion area. If necessary, this can also be interspersed with reflectively scattering surfaces. Further details relating to this are found in the description of the embodiments.

For the generation of converted light, the fluorescent device according to the disclosure, i.e. the internally cooled dual fluorescent wheel, is completed with at least one excitation laser, which is designed for the emission of an excitation-laser radiation, and at least one reflector at a reflector lamp arrangement according to the disclosure. The reflector lamp arrangement according to the disclosure is designed for the excitation-laser radiation to impinge on the at least one rotating conversion area of the fluorescent device, to be wavelength-converted by the luminous material of the at least one conversion area and at least a part of the wavelength-converted light to impinge on the at least one reflector.

For this purpose, the at least one reflector is provided with at least one opening through which the at least one excitation-laser beam impinges on a conversion area and possibly, at least temporarily, also on a scattering area of the rotating dual fluorescent wheel. The at least one excitation-laser beam is preferably generated by means of one or a number of laser diodes of identical or different wavelengths.

The several laser diodes are arranged in such a manner that they radiate in through at least one reflector opening onto the dual fluorescent wheel. The laser beams preferably impinge on the same place of the conversion area. The useful light coming from the reflector (converted light and possibly reflectively scattered excitation light) can then be supplied, depending on the field of application, to other optical and/or optoelectronic components, especially for mixing the colored light components in an optical integrator.

Especially for projection purposes, it may be advantageous for an extension of the color range to use two or more excitation lasers including different laser lines. Similarly, it may be advantageous to provide the reflector with a dichroitic filter layer in order to achieve more definite reflections, to refine the emission spectrum of the dual fluorescent wheel or to increase the optical system efficiency.

The at least one reflector is designed preferably in such a manner that it has at least one focal point. For this purpose, the reflector can have, for example, a parabolic or elliptical shape or also a suitable freeform. In addition, reflector and dual fluorescent wheel are arranged with respect to one another in such a manner that at least a part of the at least one conversion area rotates through the at least one focal point. This has the advantage that the light rays emitted by the conversion or scattering area in the vicinity of the focal point are imaged at least largely identically by the reflector, for example, into the secondary focal point of an elliptical reflector. For this purpose, the reflector lamp arrangement is designed in such a manner that the excitation-laser beam ideally impinges on the conversion or scattering area in the (primary) focal point of the reflector. In a particularly preferred embodiment of the reflector lamp arrangement according to the disclosure, both outside surfaces of the two carrier elements of the dual fluorescent wheel are provided with at least one conversion area. The reflector consists of two half-shell reflectors having in each case at least one focal point, the reflector lamp arrangement being designed in such a manner that each of the two conversion areas rotates through one focal point of a half-shell reflector. By means of this embodiment, the dual fluorescent wheel according to the disclosure is particularly advantageously utilized since the conversion areas on both sides are used for the light conversion. In an advantageous further development, both half-shell reflectors in each case have a primary and a secondary focal point, wherein the conversion areas on the two outside surfaces of the carrier elements rotate through the respective primary focal points and the two secondary focal points coincide to form a common focal point. For this purpose, the two half-shell reflectors are suitably to be tilted against each other. This further development is particularly well suitable for coupling the generated light into an optical integrator, for example optical waveguide. Further details with respect to this are found in the description of the embodiment. In addition, it may be advantageous to displace the dual fluorescent wheel with respect to the reflector arrangement in order to be able to drive, for example, different fluorescent strips for the excitation laser radiation. The reflector half shells can be constructed differently—for example when using fluorescent strips of different widths. This is advantageous, for example, in the case of car headlamps in order to be able to implement different illumination functions such as high beam and dipped light. The annular fluorescent strips can have different radii and, in consequence, do not need to be arranged located opposite one another on the two outside surfaces.

BRIEF DESCRIPTION OF THE DRAWINGS

In the text which follows, the disclosure will be explained in greater detail with reference to exemplary embodiments. In the figures.

DETAILED DESCRIPTION

Figure 1A:
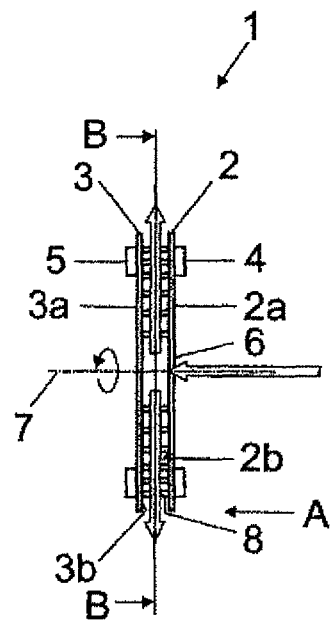
FIG. 1a shows an embodiment of the internally cooled fluorescent device according to the disclosure (dual fluorescent wheel) in a side view.
Figure 1B:
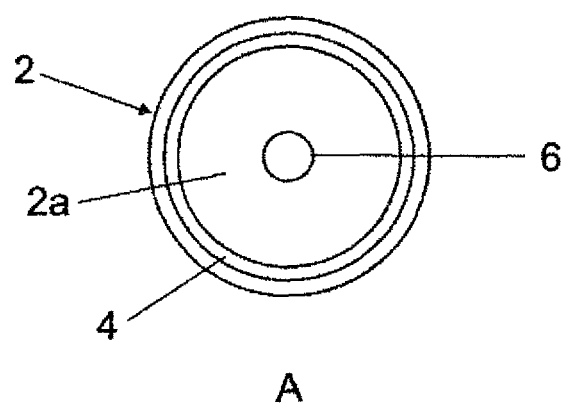
FIG. 1b shows the fluorescent device from FIG. 1a in a front view in direction A.
Figure 1C:
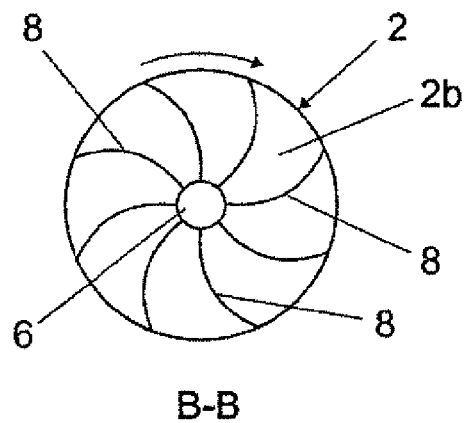
FIG. 1c shows the fluorescent device from FIG. 1a in a section view along the section line BB.

FIGS. 1a-1c show diagrammatically a side view, a front view rotated by 90° with respect to the former in direction A and a section view along line B-B of an embodiment of an internally cooled fluorescent device (dual fluorescent wheel). The fluorescent device 1 includes two disk-like carrier elements 2, 3 having in each case two sides 2a, 2b and 3a, 3b, respectively. The two carrier elements 2, 3 consist of a material having good thermal conductivity such as, for example, copper or aluminum and are arranged at a mutual distance in such a manner that one side 2b of one carrier element 2 faces a side 3b of the other carrier element 3, i.e. define two inside surfaces 2b, 3b facing one another of the fluorescent device 1. The respective other two sides 2a, 3a of the two carrier elements 2, 3 point outward, thus facing away from the interspace bounded by the two inside surfaces 2b, 3b, i.e. define two outside surfaces 2a, 3a of the fluorescent device. On the two outside surfaces 2a, 3a, an annular conversion area 4, 5 of luminous material is arranged in each case. The luminous material is here on one side a layer of Ce-doped YAG emitting green light (G) on excitation, on the other side a layer of Eu-doped YAG emitting red light (R) on excitation. In this manner, light having two different colors can be generated by conversion of the excitation-laser radiation with the aid of the fluorescent device 1. Depending on requirement, the luminous material used for the conversion areas arranged on both sides can also be identical, however. For example, it is conceivable to generate different colors of light also by separate luminous devices and combine the respective color components of light in a suitable manner. The carrier element 2 on the right in FIG. 1a has at its center a circular opening 6. Axially with respect to this hole, an axis of rotation 7 which in operation of the fluorescent device 1 provides for a rotation of the two carrier elements 2, 3 extends pointing away from the outside surface 3a of the carrier element 3, on the left in FIG. 1a. The two carrier elements 2, 3 are joined to one another by means of eight wing-like cooling ribs 8 which are arranged in the interspace between the two inside surfaces 2b, 3b of the two carrier elements 2, 3. The wing-like cooling ribs 8 are oriented perpendicularly to the two inside surfaces 2b, 3b and extend initially starting radially from the opening 6 and then further bent aerodynamically in opposition to the direction of rotation indicated by means of an arrow, up to the outer edge. In operation, the ambient air flows axially into the opening 6 due to the rotation, in the interspace between the inside surfaces 2b, 3b and the mutually adjacent wing-like cooling ribs 8 essentially radially along and in the edge area of the dual fluorescent wheel out again toward the outside. In this manner, an improved dissipation of the heat introduced by the excitation-laser radiation into the luminous material of the annular conversion areas 4, 5 on both sides is achieved with the aid of an active air flow. If necessary, the heat dissipation can be improved further by flow-optimized shaping of the cooling ribs 8.

Figure 2:
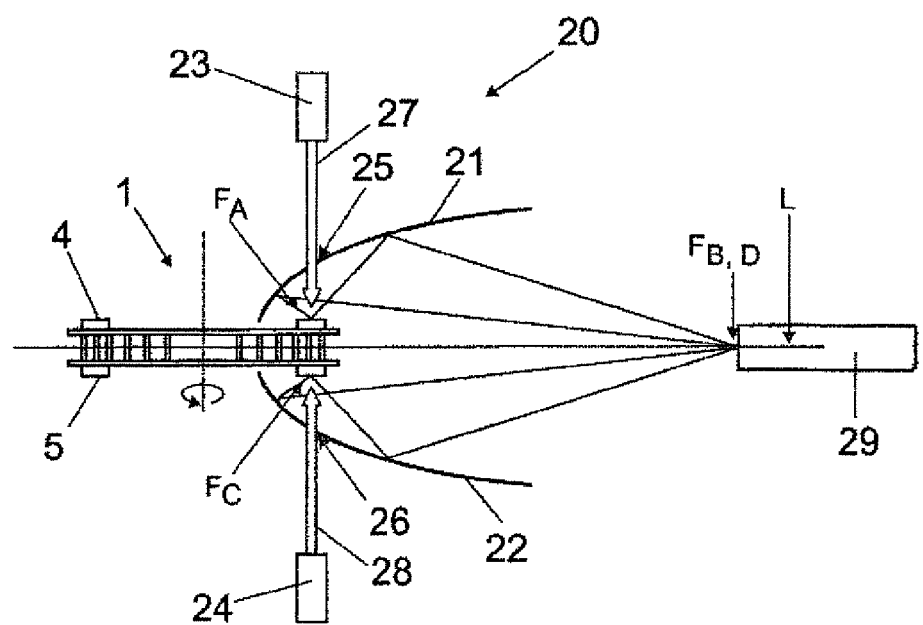
FIG. 2 shows an embodiment of the reflector lamp arrangement according to the disclosure.

FIG. 2 shows diagrammatically a longitudinal section of an exemplary embodiment of the reflector lamp arrangement 20 according to the disclosure including the fluorescent device 1 (dual fluorescent wheel) shown in FIG. 1a-1c. The plane of section passes here through the axis of rotation of the fluorescent device 1. Apart from the fluorescent device 1, the reflector lamp arrangement 20 also has two elliptical half-shell reflectors 21, 22 and two excitation lasers 23, 24. The two excitation lasers 23, 24 are two different laser diodes which emit excitation laser beams having a wavelength of approx. 450 nm and 405 nm, respectively. The two elliptical half-shell reflectors 21, 22 are arranged in such a manner with respect to the fluorescent device 1 that the annular conversion areas 4, 5 arranged on both sides rotate through the respective primary focal points $F_A$, $F_C$ of the facing half-shell reflectors 21, 22 (the means normally used for rotating the dual fluorescent wheel 1 such as axis of rotation, electric motor etc. are not shown for the sake of better clarity). In addition, the two half-shell reflectors 21, 22 are tilted toward one another in such a manner that their secondary focal points $F_B$, $F_D$ coincide on the optical axis L of the reflector lamp arrangement 20 to form the common focal point $F_{B,D}$. Each of the two half-shell reflectors 21, 22 has in each case a circular opening 25, 26 through which the excitation-laser beams 27, 28 of the excitation lasers 23, 24 irradiate the annular conversion areas 4, 5 in the area of the respective primary focal points $F_A$, $F_C$. Due to the rotation of the carrier elements 2, 3, the excitation-laser beams 27, 28 pass sequentially over the annular conversion areas 4, 5. As a result, a part area of the luminous material is heated up always only for a short time in each of the two annular conversion areas 4, 5 by the respective excitation-laser beam 27, 28. In addition, the heat introduced by the excitation-laser beams 27, 28 is removed efficiently via the carrier elements 2, 3 and especially the forced cooling air flow which flows into the dual fluorescent wheel 1 through the axial opening 6 and flows out essentially radially at its edge. As a result, high excitation-laser power densities can be achieved on the conversion areas 4, 5 without the luminous material being degraded too rapidly or even destroyed. The light rays wavelength-converted by the respective luminous material are reflected, possibly together with a proportion of the non-wavelength-converted, but only reflectively dispersed blue (B) excitation-laser beams, via the respective half-shell reflector 21, 22 toward the common third focal point $F_{B,D}$. At that point, the entry face of an optical waveguide 29 is positioned. The optical waveguide 29 is used as optical integrator for mixing and forwarding the light rays coming from the two half-shell reflectors 21, 22 with the light color components R, G, B. The mixed RGB light can be supplied, for example, to an image generator for video projection (LCD, DLP or LCoS etc.) (not shown).

In a variant, not shown, the reflector lamp arrangement is designed in such a manner that the primary focal points of the two half-shell reflectors are not at the same place with respect to the optical axis but, instead, selectively offset by a space along the optical axis. This makes it possible to irradiate annular fluorescent areas and/or reflective scattering areas having different radii and thus different length with respect to a certain angle of rotation of the dual fluorescent wheel on both sides. In this manner, it is possible to adjust the color location of the converted mixed light. If a common secondary focal point is desired, the two half-shell reflectors must be suitably tilted and displaced.

Figure 3:
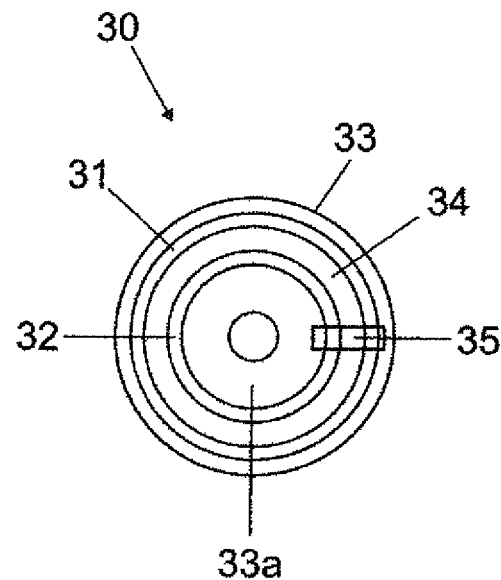
FIG. 3 shows a top view according to FIG. 1b of a further embodiment of a fluorescent device according to the disclosure, having a number of annular strips.
Figure 4:
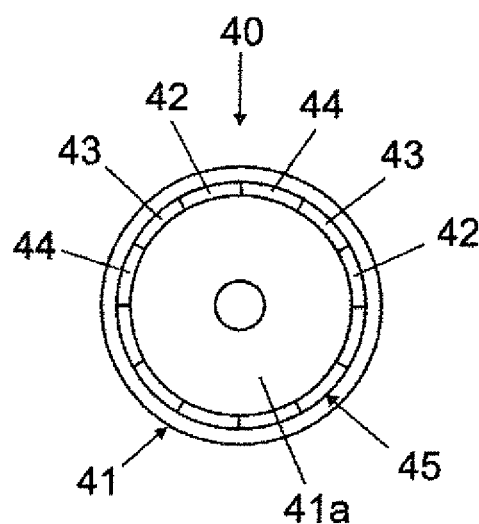
FIG. 4 shows a top view according to FIG. 1b of a further embodiment of a fluorescent device according to the disclosure having a segmented annular strip.

FIG. 3 shows the front view of a further embodiment of an internally cooled fluorescent device corresponding to the representation in FIG. 1b. The fluorescent device 30 has here, however, two annular conversion areas 31, 32 which are arranged concentrically on the outside surface 33a of the disk-like carrier element 33. The outer annular conversion area 31 consists of Ce-doped YAG (G), the inner one 32 of Eu-doped YAG (R). In addition, an annular scattering area 34 is arranged between the two annular conversion areas 31, 32. This scattering area is used for the direct utilization of the excitation-laser radiation which, in this case, is especially within the blue wavelength range (e.g. 450 nm) (B). The annular scattering area 34 is designed as a reflectively scattering surface, as a result of which the speckle characteristics, disturbing for projection purposes, of the directly used excitation-laser radiation are advantageously destroyed or at least reduced. The excitation-laser beam irradiates approximately the area bounded by a rectangle 35 in FIG. 3, which includes parts of all three annular areas 31, 32, 34 mentioned. For this purpose, the excitation-laser beam is suitably shaped by means of optics. In addition, the three annular strips are designed to be located closely next to one another. In this manner, the three light color components red (R), green (G) and blue (B) can be implemented already with one outside surface 33a. The other outside surface on the opposite side (not visible in FIG. 3) is therefore constructed here to be identical to the outside surface 33a shown. In a variant, not represented, a number of annular conversion areas having different types of luminous material are constructed concentrically and arranged in such a manner that the excitation-laser beam spot in each case preferably impinges only on one fluorescent strip in the reflector due to a displacement of the dual fluorescent wheel. By this means, a desired color of light can be selected selectively for the conversion by means of the displacement. FIG. 4 shows the front view of a further embodiment of an internally cooled fluorescent device 40 corresponding to the representation in FIG. 1b. In order to be able to hold the area of irradiation on both sides closer to the respective focal point of the two half-shell reflectors for the excitation-laser radiation, on the one hand, and, on the other hand, to have the three basic colors of light red, green, blue available, red-emitting 42 or green-emitting 43 fluorescent segments and reflective scattering segments 44 are arranged sequentially alternately within a single annular strip 45 on the respective outside surface 41a of each of the two disk-like carrier elements 41 (the other outside surface is covered in FIG. 4). For the sake of clarity, in each case only one red-emitting fluorescent segment 42, one green-emitting fluorescent segment 43 and one reflective scattering segment 44 are shown in each quadrant in FIG. 4. In practice, especially for projection purposes, however, more segments per quadrant can also be provided. The additive mixing of colors of light results in any case from the visual averaging of the light color components which are generated during the rotation of the corresponding segments 42-44 through the excitation-laser beam spot (not shown in FIG. 4). Finally, the luminous materials can also be mixed inside the annular conversion area (not shown) so that a mixture of light colors is already present in the static case, if necessary also in combination with a proportionate reflective scattering of the excitation-laser light.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A reflector lamp arrangement comprising
at least one reflector,
at least one excitation laser which is designed for the emission of an excitation-laser radiation, and
an internally cooled fluorescent device, comprising
two disk-like carrier elements having two sides each which are arranged at a mutual distance in such a manner that one side of one carrier element faces one side of the other carrier element and as a result define two inside surfaces, facing one another, of the fluorescent device, the respective other two sides of the two carrier elements pointing toward the outside and thus defining two outside surfaces of the fluorescent device,
at least one conversion area which contains a luminous material and is arranged on at least one of the two outside surfaces, and
at least one opening which is arranged in at least one of the two carrier elements;
wherein the reflector lamp arrangement is designed for the excitation-laser radiation to impinge on the at least one conversion area of the fluorescent device, to be wavelength-converted by the luminous material of the at least one conversion area and at least a part of the wavelength-converted light to impinge on the at least one reflector.

2. The reflector lamp arrangement as claimed in claim 1, which is designed for at least a part of the excitation-laser radiation to impinge at least temporarily also on the at least one scattering area of the fluorescent device, to be reflectively scattered by its reflectively scattering surface and at least a part of the reflectively scattered light to impinge on the at least one reflector.

3. The reflector lamp arrangement as claimed in claim 1, which is designed for at least one of the two disk-like carrier elements to rotate and a cooling medium to enter through the at least one opening in one of the carrier elements, flow through the internal space between the inside surfaces of the two disk-like carrier elements and leave at its edge area.

4. The reflector lamp arrangement as claimed in claim 3, wherein the cooling ribs, extending essentially radially in the interspace between the inside surfaces of the two disk-like carrier elements, are bent in opposition to the direction of rotation of the fluorescent device.

5. The reflector lamp arrangement as claimed in claim 3, wherein the cooling medium is a component of a closed cooling circuit.

6. The reflector lamp arrangement as claimed in claim 1, which is designed in such a manner that the at least one reflector has at least one focal point and that at least a part of the at least one conversion area rotates through the at least one focal point.

7. The reflector lamp arrangement as claimed in claim 1, wherein both outside surfaces of the two carrier elements of the fluorescent device are provided with a conversion area and wherein the reflector comprises two half-shell reflectors having in each case one focal point, wherein the reflector lamp arrangement is designed in such a manner that each of the two conversion areas rotates through one focal point of a half-shell reflector.

8. The reflector lamp arrangement as claimed in claim 7, which is designed in such a manner that both half-shell reflectors in each case have a primary and a secondary focal point, wherein the conversion areas on the two outside surfaces of the carrier elements rotate through the respective primary focal points and the two secondary focal points coincide to form a common focal point.

* * * * *